(12) United States Patent  
Finke

(10) Patent No.: US 11,698,111 B1
(45) Date of Patent: Jul. 11, 2023

(54) HIGH RAMP ANGLE DISCONNECT SHAFT

(71) Applicant: Hamilton Sundstrand Corporation, Charlotte, NC (US)

(72) Inventor: Aaron M. Finke, Janesville, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/720,428

(22) Filed: Apr. 14, 2022

(51) Int. Cl.
*F16D 11/04* (2006.01)
*F16D 23/12* (2006.01)

(52) U.S. Cl.
CPC ............ *F16D 11/04* (2013.01); *F16D 23/12* (2013.01); *F16D 2023/123* (2013.01); *F16D 2500/10462* (2013.01)

(58) Field of Classification Search
None
See application file for complete search history.

(56) References Cited

U.S. PATENT DOCUMENTS

| 4,244,455 | A | 1/1981 | Loker | |
|---|---|---|---|---|
| 10,677,292 | B2 * | 6/2020 | Campbell | F16D 23/12 |
| 11,226,013 | B2 | 1/2022 | Campbell et al. | |
| 2010/0283341 | A1 * | 11/2010 | Grosskopf | F16D 23/12 310/78 |
| 2013/0112522 | A1 * | 5/2013 | Granzow | F16H 63/304 192/69.9 |
| 2017/0016489 | A1 * | 1/2017 | Grosskopf | F16D 23/12 |
| 2019/0154091 | A1 * | 5/2019 | Hochstetler | H02K 7/1823 |
| 2019/0154124 | A1 * | 5/2019 | Beard | F02C 7/32 |
| 2020/0223309 | A1 * | 7/2020 | Beesley | F16H 25/18 |

FOREIGN PATENT DOCUMENTS

| DE | 102009037557 A1 * | 2/2011 | ............. B60K 28/16 |
|---|---|---|---|
| WO | 2021181105 A1 | 9/2021 | |

* cited by examiner

*Primary Examiner* — Timothy Hannon
(74) *Attorney, Agent, or Firm* — Cantor Colburn LLP

(57) ABSTRACT

A disconnect mechanism to disconnect an electric machine from an ancillary component includes a ramp shaft connected to a disconnect shaft of the electric machine, and connected to the ancillary component, such that when connected to the ancillary component the disconnect shaft transmits rotational energy between the electric motor and the ancillary component. The ramp shaft includes a disconnect feature. A plunger is selectably engageable with the disconnect feature to disconnect the ramp shaft from the disconnect shaft. The disconnect feature includes a drop-in window for initial engagement with the plunger, and a ramp surface extending in a circumferential direction from the drop in window at an acute angle relative to the drop in window. Engagement of the plunger with the ramp surface urges movement of the ramp shaft in an axial direction away from the disconnect shaft to disconnect the ramp shaft from the disconnect shaft.

19 Claims, 5 Drawing Sheets

US 11,698,111 B1

HIGH RAMP ANGLE DISCONNECT SHAFT

BACKGROUND

Exemplary embodiments pertain to the art of electric motor systems, and in particular to disconnection of an electric motor from an ancillary component.

An electric motor system includes an electric motor connectable to an ancillary component, such as a propulsion system drive train. Under certain operating conditions it is desired to disconnect the electric motor from the ancillary component. To achieve this, the electric motor includes a disconnect shaft which is selectably engageable with an output shaft to disengage the electric motor from the ancillary component.

In order to reduce the overhung moment to the electric motor, the largest and heaviest components are positioned closest to the mounting flange, or drive end. Smaller and lighter components then must be positioned farther from the mounting flange. In order to connect the small components, such as the disconnect shaft, to the drive end, the diameter of the disconnect shaft is reduced, thus resulting in a smaller engagement portion on the ramp shaft for the plunger.

BRIEF DESCRIPTION

In one embodiment, a disconnect mechanism to disconnect an electric machine from an ancillary component includes a ramp shaft connected to a disconnect shaft of the electric machine, and connected to the ancillary component, such that when connected to the ancillary component the disconnect shaft transmits rotational energy between the electric motor and the ancillary component. The ramp shaft includes a disconnect feature. A plunger is selectably engageable with the disconnect feature to disconnect the ramp shaft from the disconnect shaft. The disconnect feature includes a drop-in window for initial engagement with the plunger, and a ramp surface extending in a circumferential direction from the drop in window at an acute angle relative to the drop in window. Engagement of the plunger with the ramp surface urges movement of the ramp shaft in an axial direction away from the disconnect shaft to disconnect the ramp shaft from the disconnect shaft.

Additionally or alternatively, in this or other embodiments the acute angle is in the range of 8 degrees to 9 degrees.

Additionally or alternatively, in this or other embodiments the acute angle is 8.7 degrees.

Additionally or alternatively, in this or other embodiments the drop-in window extends in the range of 135 degrees to 145 degrees circumferentially around the ramp shaft.

Additionally or alternatively, in this or other embodiments the drop-in window extends 140.6 degrees circumferentially around the ramp shaft.

Additionally or alternatively, in this or other embodiments the drop in window is defined perpendicular to a central axis of rotation of the ramp shaft.

Additionally or alternatively, in this or other embodiments the drop-in window extends partially circumferentially about the ramp shaft, and the ramp surface extends about the remainder of the ramp shaft circumference.

Additionally or alternatively, in this or other embodiments the ramp shaft is connected to the disconnect shaft at a first axial end of the ramp shaft, and the disconnect feature is disposed at a second axial end of the ramp shaft.

Additionally or alternatively, in this or other embodiments the plunger is engageable with the ramp shaft via operation of a solenoid operably connected to the plunger.

In another embodiment, an electric machine system includes an electric machine and an ancillary component selectably disconnectable from the electric machine ancillary component. A disconnect mechanism disconnects the electric machine from the ancillary component and includes a ramp shaft and disconnect shaft of the electric machine selectable connectible to an ancillary component and connected to the ancillary component, such that when connected to the ancillary component, the disconnect shaft transmits rotational energy between the electric motor and the ancillary component. The ramp shaft includes a disconnect feature. A plunger is selectably engageable with the disconnect feature to disconnect the disconnect shaft from the ancillary component. The disconnect feature includes a drop-in window for initial engagement with the plunger, and a ramp surface extending in a circumferential direction from the drop in window at an acute angle relative to the drop in window. Engagement of the plunger with the ramp surface urges movement of the ramp shaft in an axial direction away from the ancillary component to disconnect the disconnect shaft from the ancillary component.

Additionally or alternatively, in this or other embodiments the acute angle is in the range of 8 degrees to 9 degrees.

Additionally or alternatively, in this or other embodiments the acute angle is 8.7 degrees.

Additionally or alternatively, in this or other embodiments the drop-in window extends in the range of 135 degrees to 145 degrees circumferentially around the ramp shaft.

Additionally or alternatively, in this or other embodiments the drop-in window extends 140.6 degrees circumferentially around the ramp shaft.

Additionally or alternatively, in this or other embodiments the drop in window is defined perpendicular to a central axis of rotation of the ramp shaft.

Additionally or alternatively, in this or other embodiments the drop-in window extends partially circumferentially about the ramp shaft, and the ramp surface extends about the remainder of the ramp shaft circumference.

Additionally or alternatively, in this or other embodiments the ramp shaft is connected to the disconnect shaft at a first axial end of the ramp shaft, and the disconnect feature is disposed at a second axial end of the ramp shaft.

Additionally or alternatively, in this or other embodiments the plunger is engageable with the ramp shaft via operation of a solenoid operably connected to the plunger.

Additionally or alternatively, in this or other embodiments the electric machine is an electric motor.

Additionally or alternatively, in this or other embodiments the ancillary component is a propulsion system drive train.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
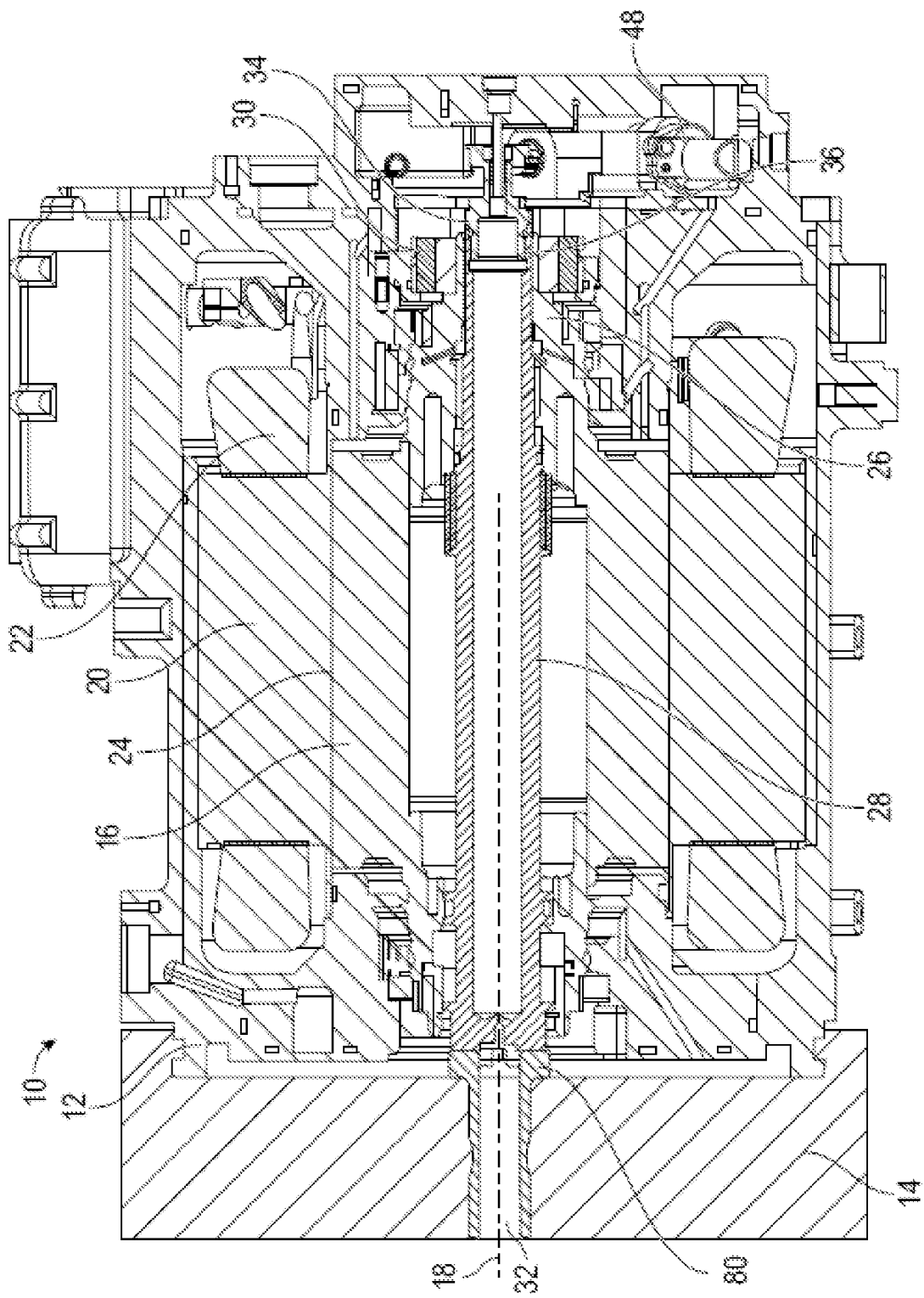
FIG. 1 is a cross-sectional view of an embodiment of an electric machine system.

Referring to FIG. 1, illustrated is a cross-sectional view of an embodiment of an electric motor system 10. The electric motor system 10 includes an electric machine, such as an electric motor 12 selectably connectible to and disconnectable from an ancillary component 14, such as a propulsion system drive train or other component. The ancillary component 14 includes an input shaft 32 through which rotational energy from the electric motor 12 to the ancillary component 14. More particularly, the input shaft 32 is connected to the disconnect shaft 28 via a dog tooth clutch 80.

The electric machine 12 includes a rotor 16 located at and rotatable about a central axis 18. A stator 20 including a plurality of conductive windings 22 is located radially outboard of the rotor 16 defining a radial air gap 24 between the rotor 16 and the stator 20. In operation, when the stator 20 is electrically energized, magnetic interaction between the stator 20 and the rotor 16 across the air gap 24 urges rotation of the rotor 16 about the central axis 18. The rotor 16 includes a rotor shaft 26, and a disconnect shaft 28 located radially inboard of the rotor shaft 26. The disconnect shaft 28 is operably connected to the rotor shaft 26 by, for example a spline connection so that the disconnect shaft 28 rotates together with the output shaft 26, which rotates with the rotor 16 about the central axis 18. A resolver 30 is located radially outboard of the output shaft 26 and is utilized to determine an angular position of the rotor 16.

Figure 2:
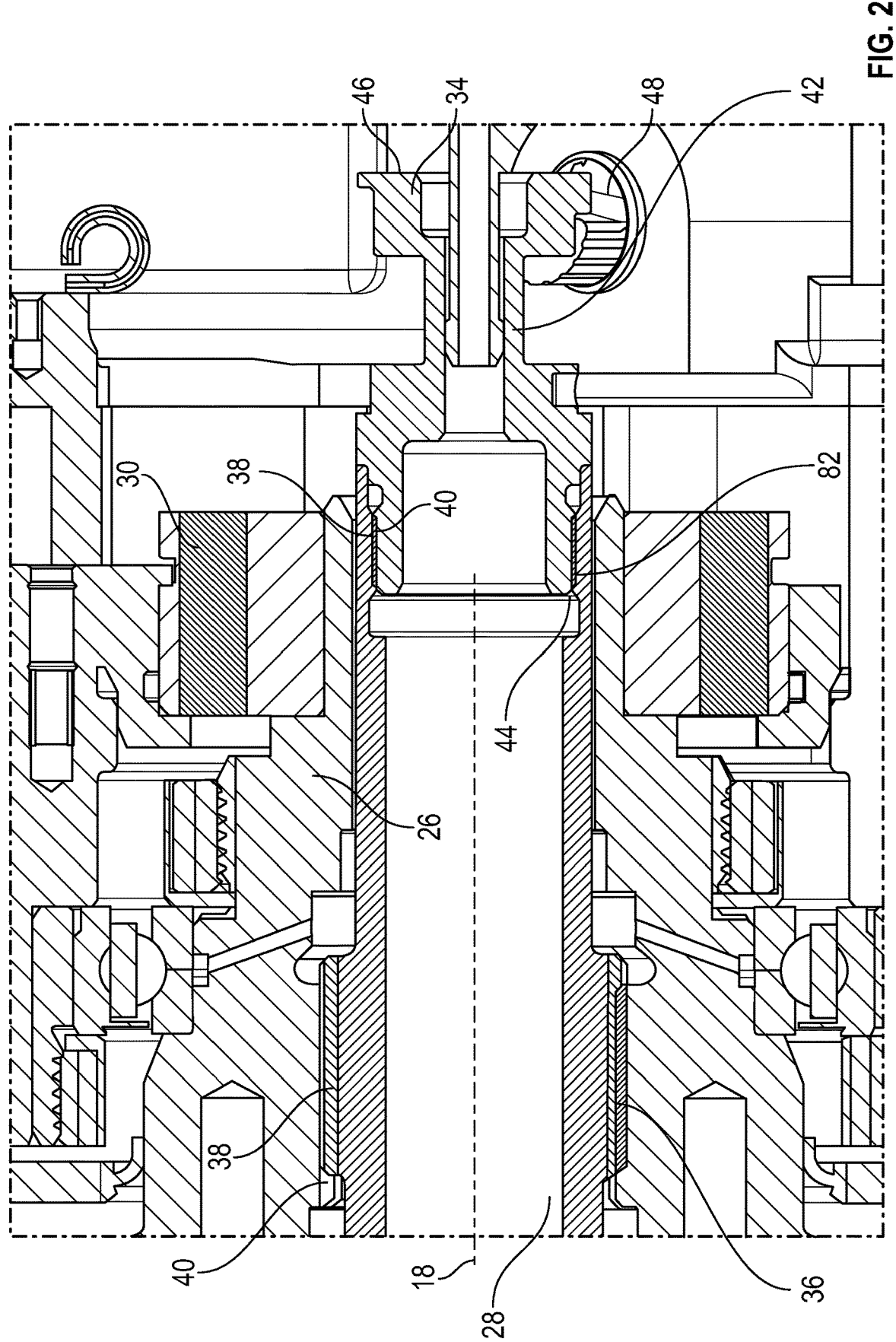
FIG. 2 is a partial cross-sectional view of an embodiment of an electric machine system.

Referring now to FIG. 2, a spline connection 36 is defined between a disconnect shaft outer surface 38 and the rotor shaft inner surface 40 to connect the disconnect shaft 28 and the rotor shaft 26. A threaded connection 82 is defined between the disconnect shaft 28 and the ramp shaft 34 to operable connect the ramp shaft 34 to the disconnect shaft 28. The ramp shaft 34 is selectably interactive with a plunger 48, which results in disconnection of the ramp shaft 34 and disconnect shaft 28 at the dog clutch connection 80. The resolver 30 surrounds the rotor shaft 26, and thus limits an outer diameter of the rotor shaft 26 as well as those of the disconnect shaft 28 and the ramp shaft 34.

Figure 3:
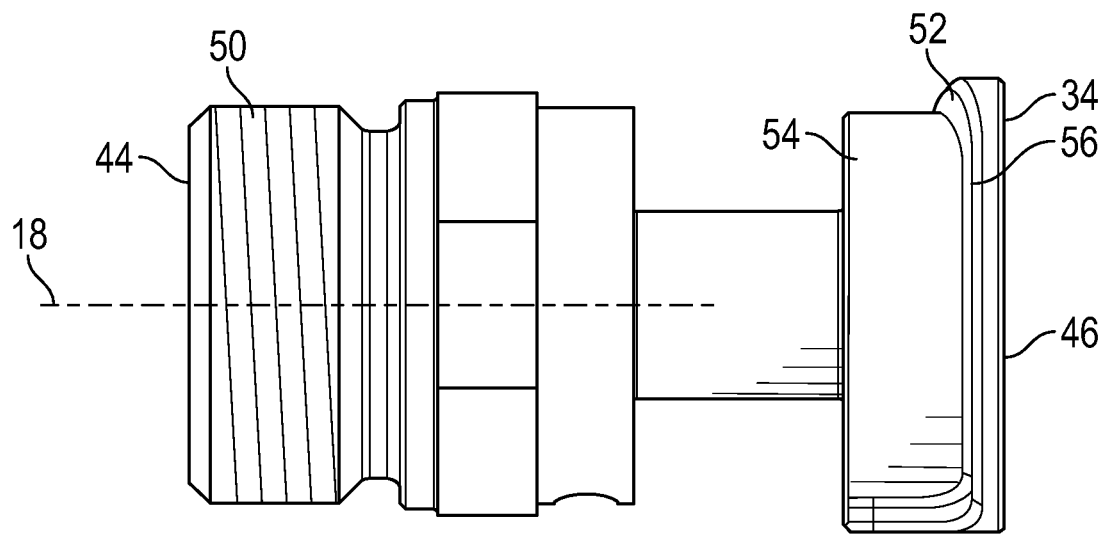
FIG. 3 is a first perspective view of an embodiment of a ramp shaft.
Figure 4:
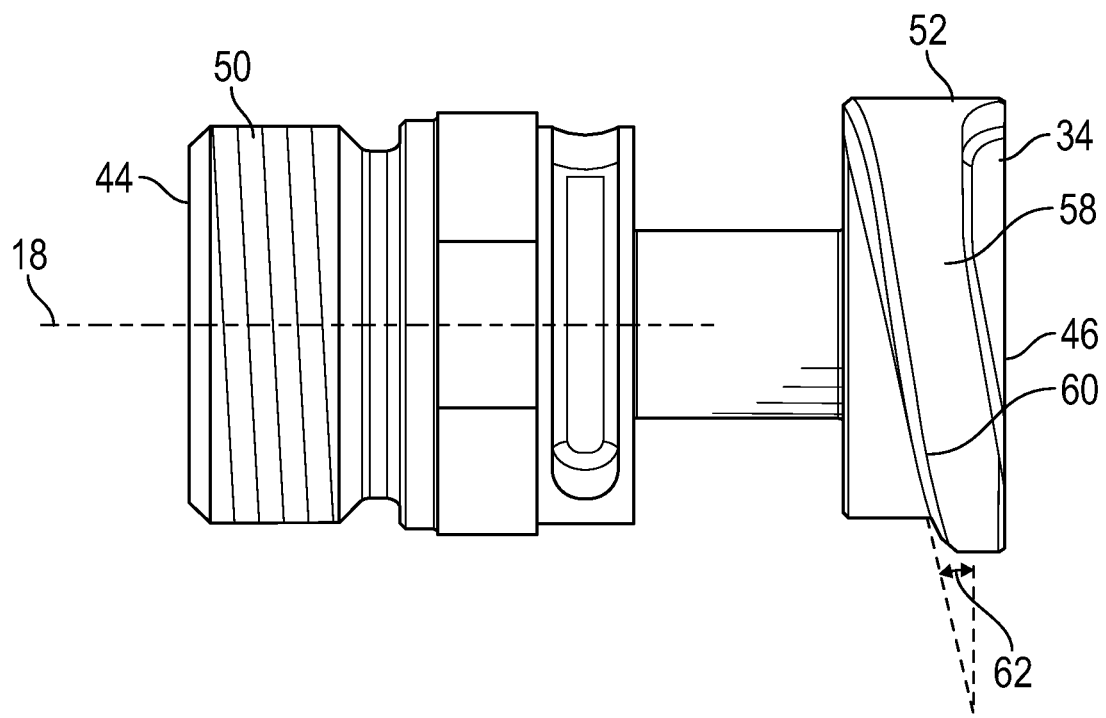
FIG. 4 is a second perspective view of an embodiment of a ramp shaft.
Figure 5:
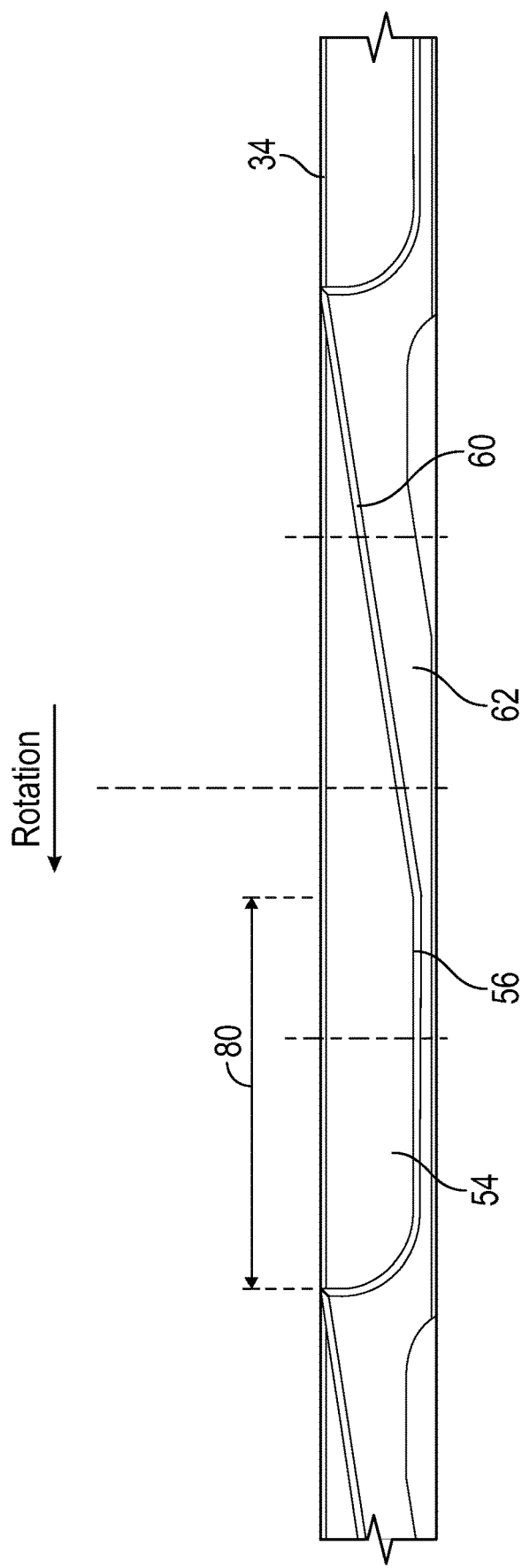
FIG. 5 is a rollout view of a drop-in window and a ramp of an embodiment of a ramp shaft.

Referring now to FIGS. 3-5, the ramp shaft 34 is illustrated in more detail. The ramp shaft 34 includes threads 50 at the first ramp shaft end 44 and a circumferentially extending ramp portion 52 at the second ramp shaft end 46. The ramp portion 52 includes a drop-in window 54, shown in FIG. 3, which is defined by a circumferentially-extending drop-in surface 56, and a ramp 58, shown in FIG. 4, which is defined by a circumferentially-extending ramp surface 60. The drop-in surface 56 extends in a radial direction, perpendicular to the central axis 18. The ramp surface 60 circumferentially abuts the drop-in surface 56 and extends at an acute ramp angle 62 from the drop-in surface 56 toward the rotor 16, relative to the drop-in surface 56.

Shown in FIG. 5 is a rollout view of the drop-in window 54 and the ramp 58. The drop-in surface 56 extends circumferentially partially around the ramp shaft 34, and the ramp surface 60 extends the remainder of the circumference around the ramp shaft 34. In some embodiments, the drop-in surface 56 extends circumferentially over a drop-in angle 80 in the range of 135 to 145 degrees around the ramp shaft 34, while the ramp surface 60 extends the remaining circumferential distance around the ramp shaft 34. In one embodiment, the drop-in surface 56 extends 140.6 circumferential degrees around the ramp shaft 34, while the ramp surface 60 extends the remaining circumferential distance around the ramp shaft 34. The ramp surface 60 extends at a constant and continuous ramp angle 62 the remaining circumferential distance to meet the meet the drop-in window 54. In some embodiments, the ramp angle 62 is in the range of 8 degrees to 9 degrees, while in one embodiment the ramp angle is 8.7 degrees.

Figure 6:
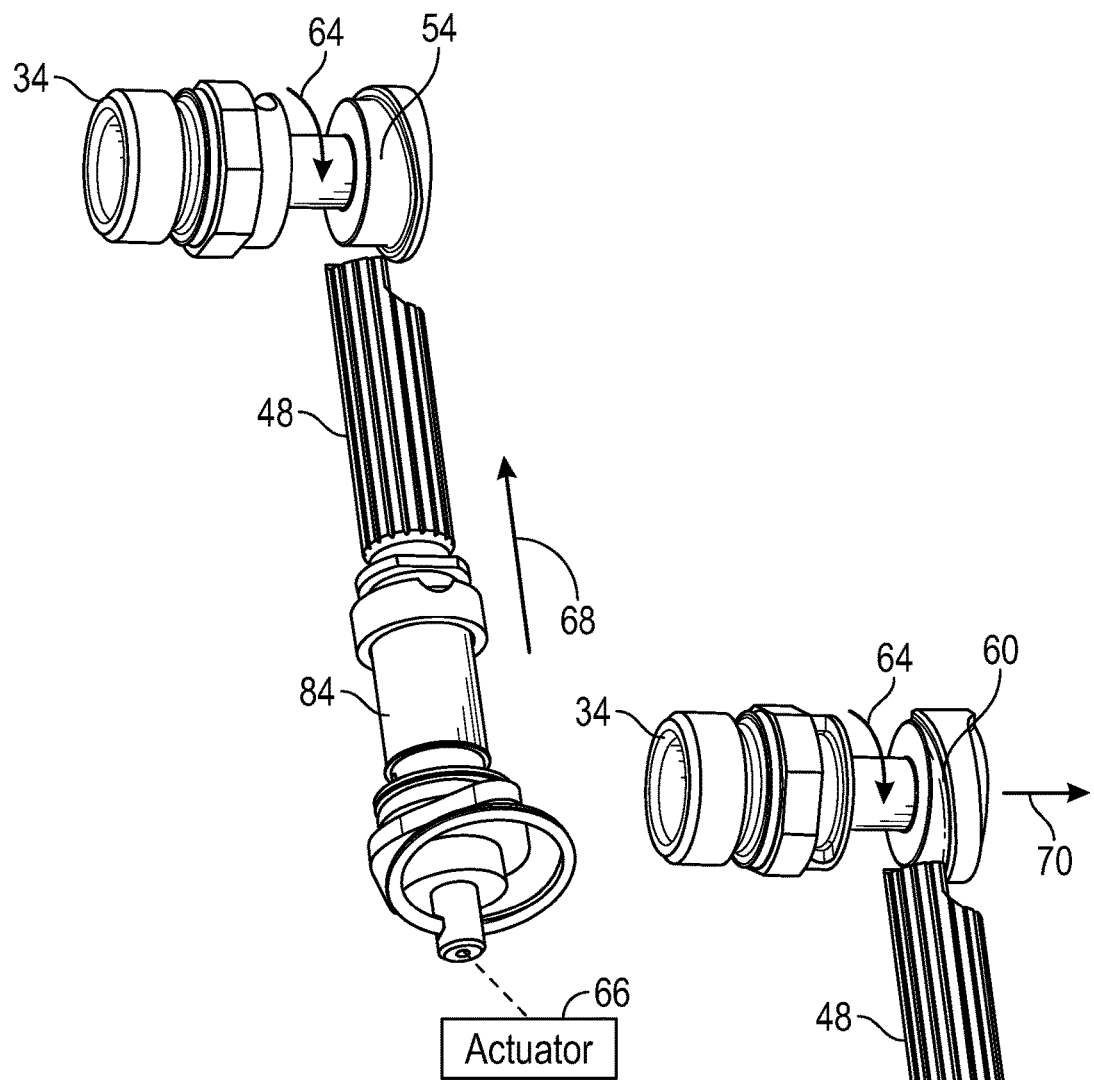
FIG. 6 is a schematic illustration of a ramp shaft and a plunger where the plunger is not engaged with the ramp shaft.
Figure 7:
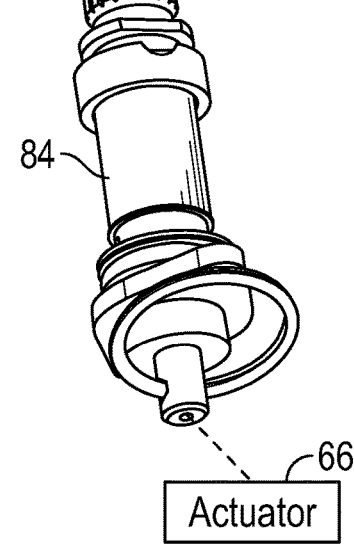
FIG. 7 is a schematic illustration of the ramp shaft and the plunger where the plunger is engaged with the ramp shaft.

Referring now to FIGS. 6 and 7, illustrated is the operation of the ramp shaft 34 and engagement with the plunger 48 to disconnect the ramp shaft 34 and disconnect shaft 28 from the ancillary component 14. The surrounding structure is omitted from the FIGs. for the sake of clarity. The plunger 48 is shown in a disengaged position relative to the ramp shaft 34 in FIG. 6. The ramp shaft 34 is connected to the disconnect shaft 36 (shown in FIG. 2) and is rotating with the rotor 16 of the electric machine 12 in a rotation direction 64. When it is desired to disconnect the electric motor 12 from the ancillary component 14, the plunger 48 is activated by operation of an actuator 66, such as a solenoid or other actuator, or by a spring 84. In one embodiment, a solenoid pin engages the plunger 48 and holds the plunger 48 in the disengaged position. When the solenoid is energized, the solenoid pin retracts, thus disengaging from the plunger 48. Activation of the plunger 48 urges the plunger 48 toward the ramp shaft 34 in a radial direction 68 relative to the central axis 18. As the ramp shaft 34 rotates, the plunger 48 engages with the ramp shaft 34 at the drop-in window 54. Referring now to FIG. 7, as the ramp shaft 34 continues to rotate, the plunger 48 engages the ramp surface 60, and continued rotation of the ramp shaft 34 with the plunger 48 engaged to the ramp surface 60 urges movement of the ramp shaft 34 in an axial direction 70 thus disconnecting the electric motor 12 from the ancillary component 14.

The ramp shaft 34 with the drop-in window 54 and ramp surface 60 as disclosed herein allows for usage with reduced diameter disconnect shafts and off the shelf components, such as the resolver 30 and the plunger 48, and allows for configurations of electric motor 10 with reduced overhung moment, and further reduces plunger 48 stresses by allowing for larger diameter plunger 48 due to increased circumferential width of the drop-in window 54.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A disconnect mechanism to disconnect an electric machine from an ancillary component, comprising:
    a ramp shaft connected to a disconnect shaft of the electric machine, and connected to the ancillary component, such that when connected to the ancillary component the disconnect shaft transmits rotational energy between the electric motor and the ancillary component, the ramp shaft including a disconnect feature; and
    a plunger selectably engageable with the disconnect feature to disconnect the ramp shaft from the disconnect shaft;
    wherein the disconnect feature includes:
        a drop-in window for initial engagement with the plunger; and
        a ramp surface extending in a circumferential direction from the drop in window at an acute angle relative to the drop in window, such that engagement of the plunger with the ramp surface urges movement of the ramp shaft in an axial direction away from the disconnect shaft to disconnect the ramp shaft from the disconnect shaft;
        wherein the drop-in window extends in the range of 135 degrees to 145 degrees circumferentially around the ramp shaft.

2. The disconnect mechanism of claim 1, wherein the acute angle is in the range of 8 degrees to 9 degrees.

3. The disconnect mechanism of claim 2, wherein the acute angle is 8.7 degrees.

4. The disconnect mechanism of claim 1, wherein the drop-in window extends 140.6 degrees circumferentially around the ramp shaft.

5. The disconnect mechanism of claim 1, wherein the drop-in window is defined perpendicular to a central axis of rotation of the ramp shaft.

6. The disconnect mechanism of claim 1, wherein the drop-in window extends partially circumferentially about the ramp shaft, and the ramp surface extends about the remainder of the ramp shaft circumference.

7. The disconnect mechanism of claim 1, wherein the ramp shaft is connected to the disconnect shaft at a first axial end of the ramp shaft, and the disconnect feature is disposed at a second axial end of the ramp shaft.

8. The disconnect mechanism of claim 1, wherein the plunger is engageable with the ramp shaft via operation of a solenoid operably connected to the plunger.

9. An electric machine system, comprising:
    an electric machine;
    an ancillary component selectably disconnectable from the electric machine; and
    a disconnect mechanism to disconnect the electric machine from the ancillary component, including:
        a ramp shaft and disconnect shaft of the electric machine selectable connectible to the ancillary component, and connected to the ancillary component, such that when connected to the ancillary component, the disconnect shaft transmits rotational energy between the electric motor and the ancillary component, the ramp shaft including a disconnect feature; and
        a plunger selectably engageable with the disconnect feature to disconnect the disconnect shaft from the ancillary component;
    wherein the disconnect feature includes:
        a drop-in window for initial engagement with the plunger; and
        a ramp surface extending in a circumferential direction from the drop in window at an acute angle relative to the drop in window, such that engagement of the plunger with the ramp surface urges movement of the ramp shaft in an axial direction away from the ancillary component to disconnect the disconnect shaft from the ancillary component;
    wherein the plunger is disposed at a first axial end of the disconnect shaft and the ancillary component is disposed at a second axial end of the disconnect shaft opposite the first axial end.

10. The electric machine system of claim 9, wherein the acute angle is in the range of 8 degrees to 9 degrees.

11. The electric machine system of claim 10, wherein the acute angle is 8.7 degrees.

12. The electric machine system of claim 10, wherein the drop-in window extends partially circumferentially about the ramp shaft, and the ramp surface extends about the remainder of the ramp shaft circumference.

13. The electric machine system of claim 10, wherein the ramp shaft is connected to the disconnect shaft at a first axial end of the ramp shaft, and the disconnect feature is disposed at a second axial end of the ramp shaft.

14. The electric machine system of claim 10, wherein the plunger is engageable with the ramp shaft via operation of a solenoid operably connected to the plunger.

15. The electric machine system of claim 10, wherein the electric machine is an electric motor.

16. The electric machine system of claim 10, wherein the ancillary component is a propulsion system drive train.

17. The electric machine system of claim 9, wherein the drop-in window extends in the range of 135 degrees to 145 degrees circumferentially around the ramp shaft.

18. The electric machine system of claim 17, wherein the drop-in window extends 140.6 degrees circumferentially around the ramp shaft.

19. The electric machine system of claim 9, wherein the drop-in window is defined perpendicular to a central axis of rotation of the ramp shaft.

* * * * *